E. M. JUDD.
Bolts.

No. 135,560.            Patented Feb. 4, 1873.

Witnesses,
Chas H Smith
Geo. D. Walker

Inventor
Edward M. Judd,
Lemuel W. Serrell
atty.

UNITED STATES PATENT OFFICE.

EDWARD M. JUDD, OF NEW HAVEN, CONNECTICUT.

IMPROVEMENT IN BOLTS.

Specification forming part of Letters Patent No. 135,560, dated February 4, 1873.

*To all whom it may concern:*

Be it known that I, EDWARD M. JUDD, of New Haven, in the State of Connecticut, have invented an Improvement in Foot-Bolts, of which the following is a specification:

Bolts have been made for the bottoms of doors to be operated by the foot in pressing the bolt down to place, and in some instances a catch has been liberated by the foot so as to allow a spring to throw the bolt up.

The nature of my said invention consists in a dog connected with the upper end of the bolt by a rib and groove, and provided with a notch to take a rib upon the case, and with a foot-piece at the upper end. A spring forces the notch of the dog over the rib to hold the bolt when pressed down, and a spring throws the bolt up when the dog is liberated.

Figure 2:
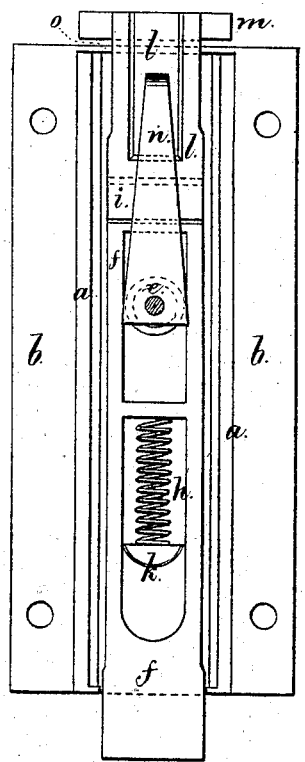
Figure 1:
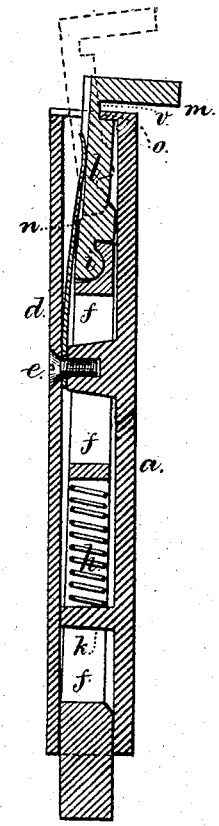

In the drawing, Figure 1 is a vertical section of the bolt, and Fig. 2 is an elevation with the back plate removed.

The case $a$ is made with the flanges $b$ for the attaching-screws, and the removable back plate $d$ is secured by the screw $e$. The bolt $f$ is made to slide within the case, and it is formed with a skeleton shank that receives the spring $h$, acting against the fixed guide-stud $k$, and serving to raise and sustain the bolt when not otherwise acted upon. The upper end of the bolt is connected by a groove and rib, $i$, with the dog $l$, that slides through the upper end of the bolt-case and terminates with the foot-piece $m$. A spring, $n$, serves to throw the dog $l$ against the rib $o$—that is, at the upper and inner edge of the bolt-case $a$—and there is a groove, $v$, across the dog $l$, just below the foot-piece $m$, so that when the foot-piece $m$, dog $l$, and bolt $f$ are forced down the spring $n$ throws the dog forward, the rib $o$ enters the groove $v$, and the bolt is securely retained in position. When the foot-piece $m$ is pushed back the dog $l$ is released by separating $o$ $v$, and the spring $h$ throws up the bolt and the dog.

The parts of this bolt are strong, easily made, and not liable either to get out of order or to be disconnected by shaking the door.

I claim as my invention—

The dog $l$, with the groove $v$ below the foot-piece $m$, in combination with the spring-bolt $f$ $h$, case $a$, and spring $n$, substantially as and for the purposes set forth.

Signed by me this 16th day of December, A. D. 1872.

E. M. JUDD.

Witnesses:
 JULIUS TRUSS,
 J. A. WEED.